United States Patent
Ben-Shalom et al.

(10) Patent No.: US 11,354,407 B2
(45) Date of Patent: Jun. 7, 2022

(54) TECHNIQUES FOR LIBRARY BEHAVIOR VERIFICATION

(71) Applicant: INTEL CORPORATION, Santa Clara, CA (US)

(72) Inventors: Omer Ben-Shalom, Rishon Le-Tzion (IL); Hila Yitzhaki, Jerusalem (IL); Yoni Wolf, Efrat (IL); Dror Shilo, Jerusalem (IL); Gyora M. Benedek, Kiriat Bialik (IL); Ezra Caltum, Ramat Gan (IL)

(73) Assignee: Intel Corporation, Santa Clara, CA (US)

( * ) Notice: Subject to any disclaimer, the term of this patent is extended or adjusted under 35 U.S.C. 154(b) by 644 days.

(21) Appl. No.: 16/235,736

(22) Filed: Dec. 28, 2018

(65) Prior Publication Data

US 2019/0138717 A1    May 9, 2019

(51) Int. Cl.
  *G06F 21/55*   (2013.01)
  *G06F 21/56*   (2013.01)
  (Continued)

(52) U.S. Cl.
  CPC .......... *G06F 21/552* (2013.01); *G06F 21/53* (2013.01); *G06F 21/554* (2013.01); *G06F 21/566* (2013.01); *G06F 21/57* (2013.01); *G06F 21/604* (2013.01); *G06F 21/64* (2013.01); *G06F 21/74* (2013.01); *H04L 63/10* (2013.01); *H04L 63/308* (2013.01); *G06F 8/41* (2013.01); *G06F 2221/2141* (2013.01)

(58) Field of Classification Search
  CPC ...... G06F 21/552; G06F 21/53; G06F 21/554; G06F 21/566; G06F 21/57; G06F 21/604; G06F 21/64; G06F 21/74; H04L 63/10; H04L 63/308
  See application file for complete search history.

(56) References Cited

U.S. PATENT DOCUMENTS

| | | | |
|---|---|---|---|
| 2005/0149726 A1* | 7/2005 | Joshi | G06F 21/53 713/164 |
| 2014/0040979 A1* | 2/2014 | Barton | G06F 21/72 726/1 |

(Continued)

OTHER PUBLICATIONS

Seo et al. (Flexdroid: Enforcing In-App Privilege Separation in Android, NDSS '16, Feb. 21-24, 2016, 15 pages) (Year: 2016).*

(Continued)

*Primary Examiner* — Oleg Korsak
(74) *Attorney, Agent, or Firm* — KDB Firm PLLC

(57) ABSTRACT

Various embodiments are generally directed to techniques for library behavior verification, such as by generating executables for software with indications of permitted behaviors by the library. Some embodiments are particularly directed to monitoring library behavior and performing one or more protective actions based on abnormal or unpermitted library behavior. In many embodiments, libraries and library manifests may be validated based on one or more signatures. In various embodiments, library behavior data comprising a set of permitted behaviors for the library may be determined based on the library manifest. In various such embodiments, a compiler may embed indications of the permitted library behavior in executables.

23 Claims, 10 Drawing Sheets

(51) Int. Cl.
*G06F 21/53* (2013.01)
*G06F 21/57* (2013.01)
*G06F 21/64* (2013.01)
*G06F 21/60* (2013.01)
*H04L 9/40* (2022.01)
*G06F 21/74* (2013.01)
*G06F 8/41* (2018.01)

(56) References Cited

U.S. PATENT DOCUMENTS

2017/0235967 A1* 8/2017 Ray .................. G06F 21/54
　　　　　　　　　　　　　　　　　　713/165
2017/0302458 A1* 10/2017 Berger ............... H04L 63/0428
2018/0004937 A1* 1/2018 Shannon ............ H04L 9/0891
2019/0081963 A1* 3/2019 Waghorn ........... H04L 63/1441
2021/0007814 A1* 1/2021 Shuma ............... G06F 21/572

OTHER PUBLICATIONS

Oracle (Java Platform, Standard Edition Tools Reference, 18 pages, 2017) (Year: 2017).*
Marinescu et al. (LFI: A Practical and General Library-Level Fault Injector, Jun. 2009, 10 pages) (Year: 2009).*

* cited by examiner

Storage Medium 700

Computer Executable Instructions for 600

Computer Executable Instructions for 650

TECHNIQUES FOR LIBRARY BEHAVIOR VERIFICATION

BACKGROUND

In computer science, a library is a collection of nonvolatile resources used by computer programs. These resources can include configuration data, documentation, help data, message templates, pre-written code, subroutines, classes, values, or type specifications. Typically, a library is a collection of implementations of behavior, written in terms of a language, that has a well-defined interface by which the behavior is invoked. For example, people who want to write a higher-level program can use a library to make system calls instead of implementing those system calls over and over again. Usually, the behavior is provided for reuse by multiple independent programs. A program invokes the library-provided behavior via a mechanism of the language. For instance, in the C programming language, behavior in a library is invoked by using C's normal function-call. Generally, the value of a library lies in the reuse of the behavior. When a program invokes a library, it gains the behavior implemented inside that library without having to implement that behavior itself.

BRIEF DESCRIPTION OF THE DRAWINGS

FIG. 7 illustrates an embodiment of a storage medium according to one or more embodiments described herein.

DETAILED DESCRIPTION

Figure 1:
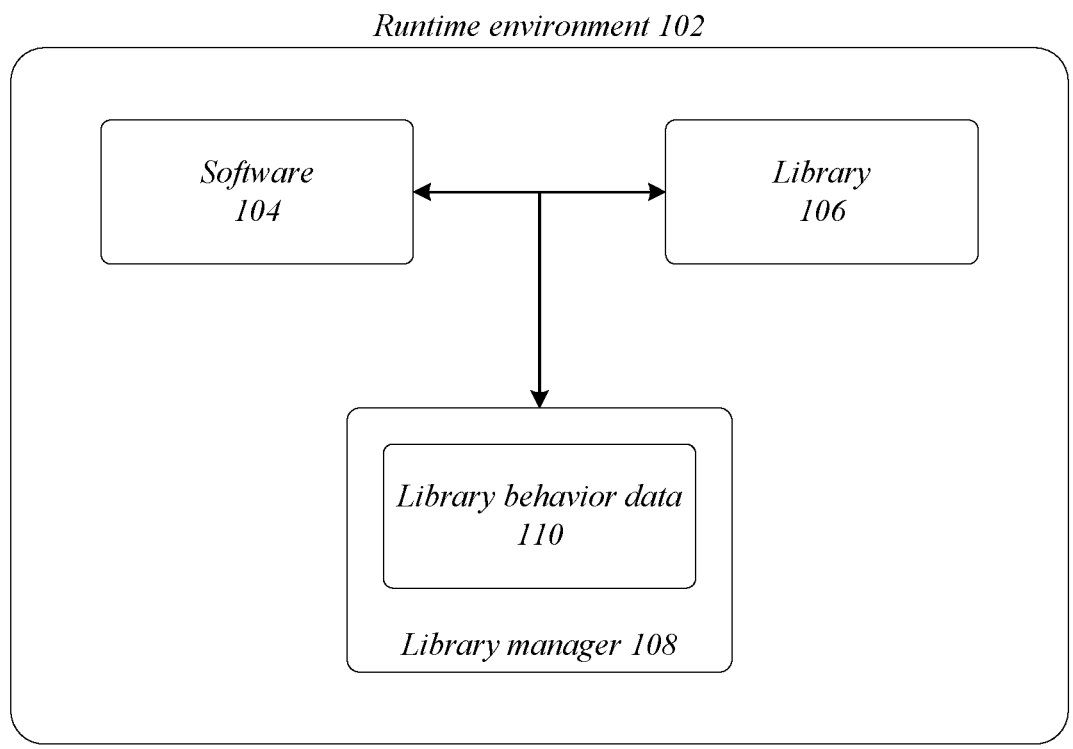
FIG. 1 illustrates exemplary aspects of a runtime environment according to one or more embodiments described herein.

Various embodiments are generally directed to techniques for library behavior verification, such as by generating executables for software with indications of permitted behaviors by the library. Some embodiments are particularly directed to monitoring library behavior and performing one or more protective actions based on abnormal or unpermitted library behavior. In many embodiments, libraries and library manifests may be validated based on one or more signatures. In many such embodiments, any changes to a library manifest may have to be approved by the developer. In various embodiments, library behavior data comprising a set of permitted behaviors for the library may be determined based on the library manifest. In various such embodiments, a compiler may embed indications of the permitted library behavior in executables. These and other embodiments are described and claimed.

Some challenges facing the use of libraries by software, such as applications or enterprise software, to realize various functionalities include the introduction of a potential attack vectors via the library. Such challenges may result from an inability to confirm the content of a library and/or identify abnormal behavior by the library. For example, a malicious entity may inject code into the library with adverse consequences. Adding further complexity, many libraries are open source. Unfortunately, this opens an attack vector allowing malicious entities an opportunity to inject code into multiple projects through a single compromise of the shared code base (i.e. the library). The issue is further exasperated by frequent updates to the library code by, potentially, multiple individuals from different organizations, which allows malicious code to be introduced at any time across a wide range of software products that utilize a compromised library. Further, manual inspection of libraries and/or duplication of library functionality is time-consuming, inefficient, and error prone. These and other factors may result software with excessive vulnerabilities, limited applicability, and poor adaptability. Such limitations can drastically reduce the usability and reliability of software, contributing to inefficient software with unnecessary attack vectors.

Various embodiments described herein include components that can enable one or more of the following: (1) formal definition of expected behavior, unexpected behavior, and/or access requirements of a library in a library manifest, (2) detecting deviation from the expected behavior and/or access requirements in a runtime environment, and (3) perform one or more protective actions in response to a deviation from the expected behavior and/or access requirements. In some embodiments, the library and library manifest may be validated based on one or more signatures. In various embodiments, the library manifest may indicate the activities the code is expected and/or not expected to perform (e.g., registry modifications of specific registry hives, access to specific directories, network access to specific sites, ports, protocols and so on). In various such embodiments, the library manifest may include a whitelist and/or a blacklist.

In many embodiments, a compiler may determine one or more permitted behaviors based on the library manifest and embed indications of the permitted behavior in executable code. In many such embodiments, the indications of permitted behavior embedded in the executable code can enable a library manager to automatically detect abnormal library behavior and implement one or more protective actions in response. In various embodiments, behaviors of libraries/modules can be controlled independent of behaviors of the software utilizing the libraries/modules One or more embodiments described herein may harden software against attack vectors that utilize malicious code injected into a library used by the software (e.g., a supply chain attack) because a change in the library code, even if missed by any static or dynamic analysis will still be limited in what it is able to do. In many embodiments, the developer may override the library manifest to further restrict what the library is allowed to do. In several embodiments, any change to a manifest may require approval by the developer. Further, due to the ability of the software loading the library to restrict the libraries activities/behavior, event subverting both the library developer and the library manifest provider will not be enough to compromise a system implementing the software. In these and other ways, components described here may increase resiliency, improve performance, and/or reduce attack vectors of software, or components thereof, in an accurate, robust, efficient, dynamic, and scalable manner, resulting in several technical effects and advantages over conventional computer technology, including increased capabilities and improved adaptability.

In various embodiments, one or more of the components may be implemented in a practical application via one or more computing devices, and thereby provide additional and useful functionality to the one or more computing devices, resulting in more capable, better functioning, and improved computing devices. In many embodiments, permitted behaviors including expected behaviors and access requirements for a library may be controlled independently of software utilizing the library via familiar, user-friendly interface objects, such as to verify, determine, and/or control permitted behavior of a library.

In several embodiments, components described herein may provide specific and particular manners of automatically monitoring and controlling library behaviors independent of software behavior, such as by generating executables with indications of permitted library behaviors. In many embodiments, one or more of the components described herein may be implemented as a set of rules that improve computer-related technology by allowing a function not previously performable by a computer that enables an improved technological result to be achieved. For example, validating a library and/or library manifest based on one or more signatures as an improved technological result. In another example, the function may include. automatically determining permitted behaviors of a library based on the library manifest and embedding indications of the permitted behaviors of the library in executables as an improved technological result. In yet another example, the function may include automatically identifying abnormal library behavior and performing one or more protective actions in response as an improved technological result.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates exemplary aspects of a runtime environment 102 in operating environment 100 according to one or more embodiments described herein. Runtime environment 102 may include software 104, library 106, and library manager 108 with library behavior data 110. In one or more embodiments described herein, library manager 108 may utilize library behavior data 110 to monitor behavior of library 106, identify abnormal behavior of library 106, and implement one or more protective actions, such as generating an exception or interrupt. In various embodiments, library behavior data 110 may include one or more permitted behaviors of the library 106 determined based on an associated library manifest that defines one or more activities the library is expected and/or not expected to perform. In many embodiments, library manager 108 may protect and/or reduce attack surfaces of one or more components of runtime environment 102, such as from a library (e.g., library 106) that has been compromised by malicious actors. Embodiments are not limited in this context.

In several embodiments described herein, libraries may be bound by a library manifest that indicates activities the code is expected to perform, such as registry modifications, access to specific directories, network access to specific sites, ports, or protocols, and so on). In several such embodiments, the libraries and/or library manifests validated based on one or more signatures. In many embodiments, the manifests may be provided by the library 106 and accepted/overwritten by the code loading the library (e.g., software 104). In various embodiments, the library 106 may be implemented in a separate or partitioned runtime environment, such as isolated portions of runtime environment 102.

In many embodiments, the separate runtime environments may be implemented using one or more methods such as running library 106 in a separate process, utilizing a sandbox. In various embodiments, separate runtime environments may enable or improve monitoring the behavior of library 106, such as by library manager 108. In one or more embodiments, library manager 108 may utilize library behavior data 110 to monitor and control the behavior of library 106.

In many embodiments, library manager 108 may automatically identify and respond to abnormal behavior by library 106. For example, library manager 108 may identify abnormal behavior caused by malicious code hidden in library 106 and perform one or more protective actions in response. In some such examples, the protective actions may include one or more of preventing the library access, generating an alert, generating an exception or interrupt, and creating a log entry. In many embodiments, the exception may be a system-level exception, such as one handled by an operating system (OS). In many such embodiments, the exception may be used to halt execution of the process. In one or more embodiments, the exception or interrupt may cause a system management mode (SMM) to be entered/activated.

In various embodiments, the protective actions may use profiler technologies to track which library is calling which function tree until the disk/network/registry access so that execution of the code can be blocked if there is an unpermitted behavior. In one or more embodiments, the library manager 108 may be implemented by software 104 and/or a system monitor that tracks behavior of the library 106 (e.g., in a Trusted Execution Environment (TEE), ring-0, or the like).

In various embodiments, the library behavior data 110 may include a set of permitted behaviors of the library 106. In some embodiments, the set of permitted behaviors may include one or more access requirements and/or expected behaviors of the library 106. In several embodiments, the one or more access requirements including one or more of driver access, directory access, registry access, network access, kernel access, memory access, ring-level access, process access, system management mode (SMM) access, and trusted execution environment (TEE) access. As will be described in more detail below, such as with respect to FIG. 2. In various embodiments, the library behavior data 110 may be embedded in one or more executables generated in a compiler environment (e.g., compiler environment 260).

Figure 2:
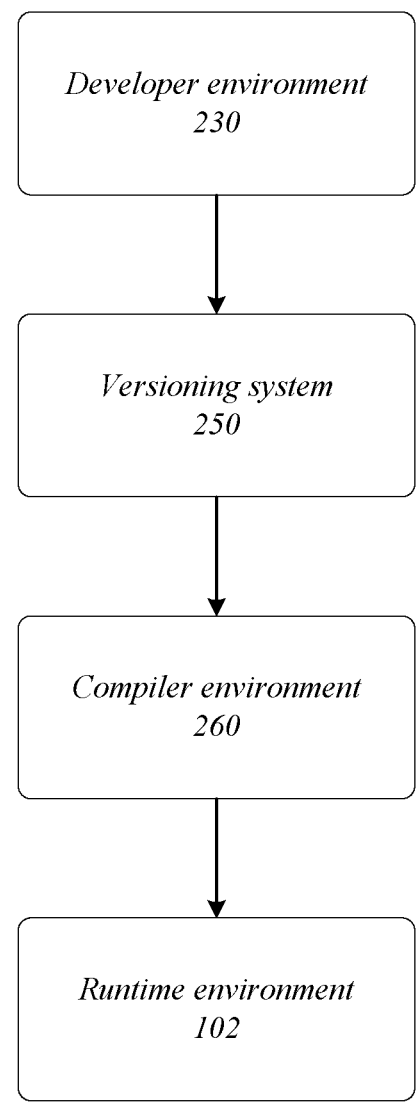
FIG. 2 illustrates exemplary aspects of a system flow according to one or more embodiments described herein.

FIG. 2 illustrates exemplary aspects of a system flow 200 according to one or more embodiments described herein. In various embodiments, system flow 200 includes an exemplary aspects of library behavior verification creation, deployment, and management. The system flow 200 includes developer environment 230, versioning system 250, compiler environment 260, and runtime environment 102. In one or more embodiments described herein, a library and corresponding library manifest may be created and/or signed in one or more developer environments 230, versioning system 250 may serve as a repository for one or more libraries, manifests, and signatures. In one or more such embodiments, one or more libraries, manifests, and signatures may be verified and indications thereof embedded into executables in compiler environment 260 and unpermitted library behavior may be identified and protected against in runtime environment 102. Embodiments are not limited in this context.

In some embodiments, developer environment 230 may be used to develop libraries and/or library manifests. In some such embodiments, one or more signatures for libraries and/or library manifests may be generated in developer environment 230. In many embodiments, developer environment 230 may be implemented in one or more of Git, Perforce, Apache Subversion, or similar systems. Library manifests may describe access requirements, unexpected behavior, and/or expected behavior of an associated library. In one or more embodiments, library manifests may include a whitelist and/or a black list of behaviors. In various embodiments, the one or more signatures may include digital signatures of libraries and/or associated library manifests. In several embodiments, the library manifest and/or one or more signatures may be saved as separate documents and/or embedded in the library. In many embodiments, libraries and library manifests may be created and/or controlled by separate entities using separate developer environments 230. For example, the library manifest may be signed and/or owned by a different entity than the library developer.

In many embodiments, when a library, an associated library manifest, and corresponding one or more signatures is generated it may be deposited with or provided to versioning system 250. The versioning system 250 may be responsible for making various versions of libraries, library manifests, and signatures available to compiler environments for use in conjunction with software. In some embodiments, versioning system may automatically update versions. In other embodiments, compiler environment 260 may retrieve versions.

In various embodiments, in compiler environment 260, a libraries and associated manifests may be loaded. In several embodiments, libraries and/or associated library manifests may be validated in compiler environment 260. In some embodiments, library behavioral data including one or more permitted library behaviors may be generated based on an associated library manifest in compiler environment 260. In many embodiments, access rights and/or permitted behaviors of a library may be modified or approved, such as by a software developer, in compiler environment 260. In one or more embodiments, the developer may override the library manifest to further restrict what the library is allowed to do. In various embodiments, any change to a manifest may require approval by the developer. In some embodiments, one or more executables with indications of the permitted behaviors may be generated in compiler environment. In many embodiments, one or more runtime protections may be embedded in one or more of the executables. In various embodiments, one or more of the executables may cause a library to be implemented in a separate process as the software using it.

In several embodiments, the one or more executables may be executed in runtime environment 102. As previously discussed, one or more of software 104, library 106, and library manager 108 may be implemented in one or more runtime environments 102, or partitions thereof. In many embodiments, a permission subsystem (e.g., library manager 108) may validate library code is executing within its permitted behaviors in runtime environment 102, such as by comparing behavior of a library access with one or more permitted library behaviors. In various embodiments, software and a library used by the software may be implemented in different processes in runtime environment 102.

Figure 3:
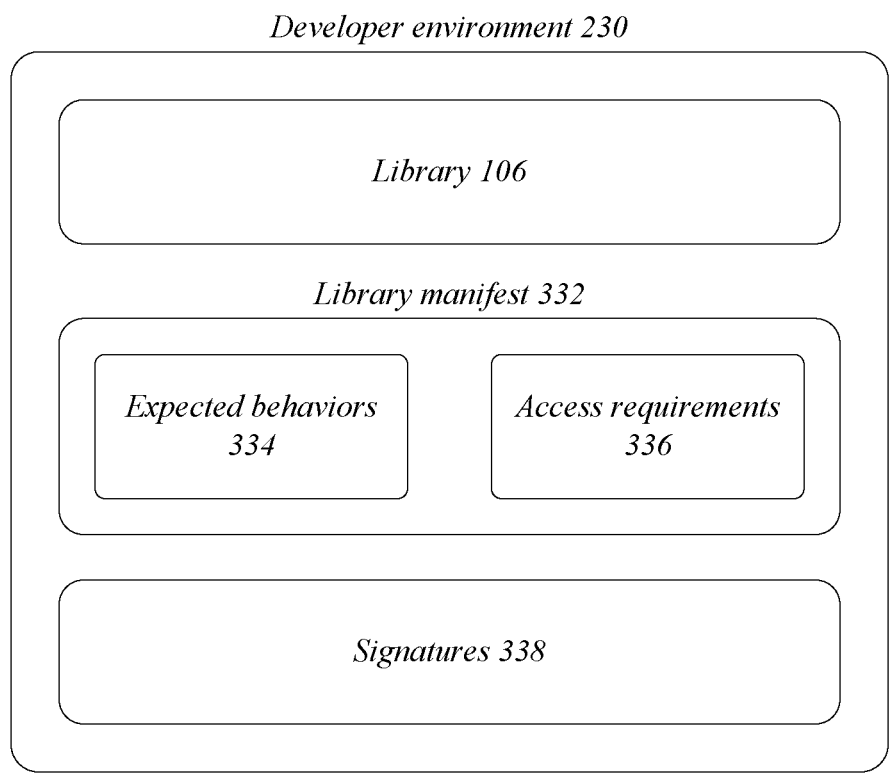
FIG. 3 illustrates exemplary aspects of a developer environment according to one or more embodiments described herein.

FIG. 3 illustrates exemplary aspects of a developer environment 230 in operating environment 300 according to one or more embodiments described herein. Developer environment 230 may include library 106, library manifest 332 with expected behaviors 334 and access requirement 336, and one or more signatures 338. In one or more embodiments described herein, one or more of the library, library manifest 332, and signatures 338 may be created in one or more developer environments 230. Embodiments are not limited in this context.

In some embodiments, developer environment 230 may be used to develop library 106, library manifest 332, and/or signatures 338. In some such embodiments, the one or more signatures 338 may include signatures for libraries and/or library manifests. In many embodiments, developer environment 230 may be implemented in one or more of Git, Perforce, Apache Subversion, or similar systems. Library manifest 332 may describe access requirements 336 and/or expected behaviors 334 of library 106. In some embodiments, the library manifest 332 may cause the rights of code in library 106 to be limited during execution.

In various embodiments, the one or more signatures 338 may include a first signature that is a digital signature of library 106 and a second signature that is a digital signature of library manifest 332. In other embodiments, the one or more signatures 338 may include a digital signature of library 106 embedded with library manifest 332. In one or more embodiments, the signatures 338 may be generated in developer environment 230 using asymmetric cryptography. In one or more such embodiments, the signatures 338 may be generated using a private key from a public/private key pair.

In several embodiments, the library manifest 332 and/or one or more signatures 338 may be saved as separate documents and/or embedded in the library 106. In many embodiments, library 106 and library manifest 332 may be created and/or controlled by separate entities using separate developer environments 230. For example, the library manifest 332 may be signed and/or owned by a different entity than the developer of library 106. In many embodiments, once library 106, library manifest 332, and the one or more signatures 338 are generated they may deposited with or provided to a versioning system.

Figure 4:
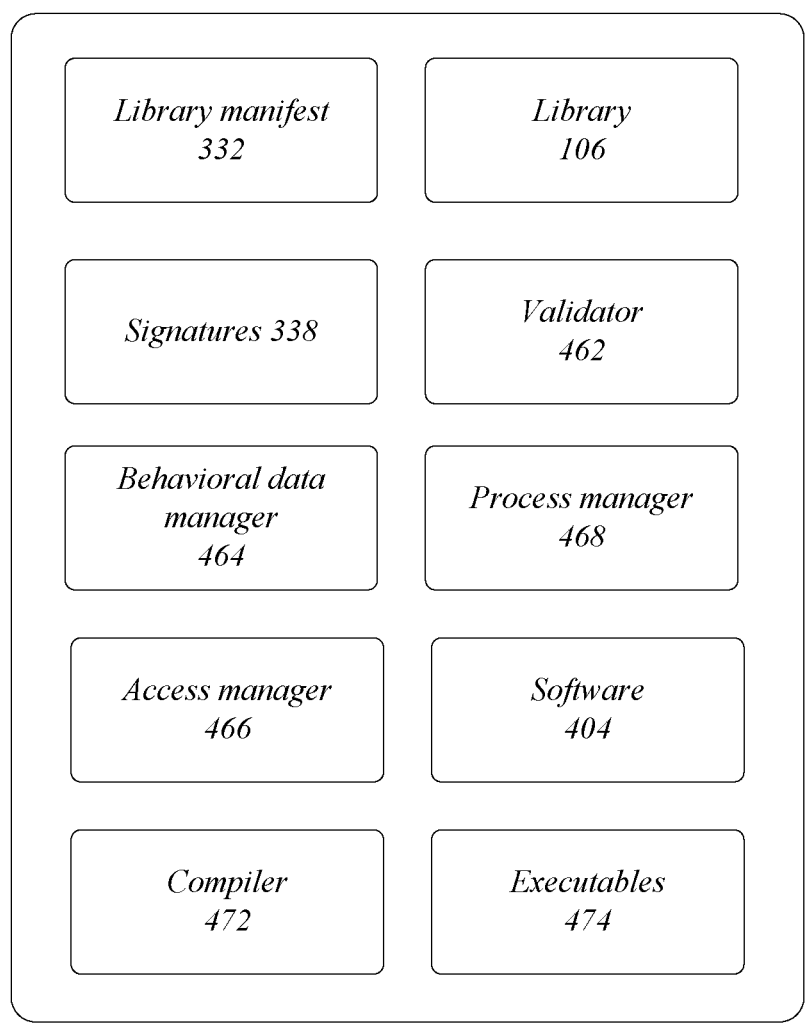
FIG. 4 illustrates exemplary aspects of a compiler environment according to one or more embodiments described here.

FIG. 4 illustrates exemplary aspects of a compiler environment 260 in operating environment 400 according to one or more embodiments described herein. Compiler environment 260 may include library 106, library manifest 332, signatures 338, validator 462, behavioral data manager 464, access manager 466, process manager 468, software 404, compiler 472, and one or more executables 474. In one or more embodiments described herein, one or more libraries, manifests, and signatures may be verified and indications thereof embedded into executables in compiler environment 260. Embodiments are not limited in this context.

In various embodiments, library 106, library manifest 332, and signatures 338 may be loaded in compiler environment 260. In some embodiments, a versioning system may be responsible for making various versions of libraries, library manifests, and signatures available to one or more compiler environments 260 for use in conjunction with software 404. In several embodiments, versioning system may automatically update versions. In other embodiments, compiler environment 260 may retrieve updated versions.

In several embodiments, library 106 and/or library manifest 332 may be validated in compiler environment 260, such as by validator 462. For example, signatures 338 may include a library signature and a manifest signature. In such examples, validator 462 may utilize a first public key to verify the digital signature of library 106. Further, validator 462 may utilize a second public to verify the digital signature of library manifest 332

In some embodiments, library behavioral data including one or more permitted library behaviors for library 106 may be generated or determined by behavioral data manager 464 based on library manifest 332 in compiler environment 260. In many embodiments, access rights and/or permitted behaviors of a library may be modified or approved, such as by a software developer, in compiler environment 260, such as via behavioral data manager 464. For example, a logging library manifest may require rights to use a network (to support network logging), but if software only utilizes the logging library for local disk logging, then the network access right may be removed.

In some embodiments, one or more executables 474 that include library behavioral data, or indications thereof, may be generated in compiler environment 260, such as by compiler 472. In many embodiments, one or more of executables 474 may be generated by compiler 472 based on software 404, library 106, and various settings indicated by one or more of validator 462, behavioral data manager 464, process manager 468, and access manager 466.

In many embodiments, one or more runtime protections may be embedded in one or more of the executables. For example, one or more of behavioral data manager 464, process manager 468, and access manager 466 may cause compiler 472 to embed runtime protection in one or more of executables 474. In some embodiments, access manager 466 may determine access requirements of library 106 based on library manifest 332. In many embodiments, process manager 468 may determine or assign a process to implement the library 106.

In some embodiments, separate process creation for a library may be performed automatically, such as by creating a stub library that would transform direct code call to inter process communications (IPC). In some such embodiments, the library may run in a process wrapper. In various embodiments, one or more of the executables 474 may cause library 106 to be implemented in a separate process as the software 404 using it, such as pursuant directives provided by process manager. In one or more embodiments, one or more of validator 462, behavioral data manager 464, process manager 468, access manager 466, and compiler 472 may be configured by input received via a user interface.

Figure 5:
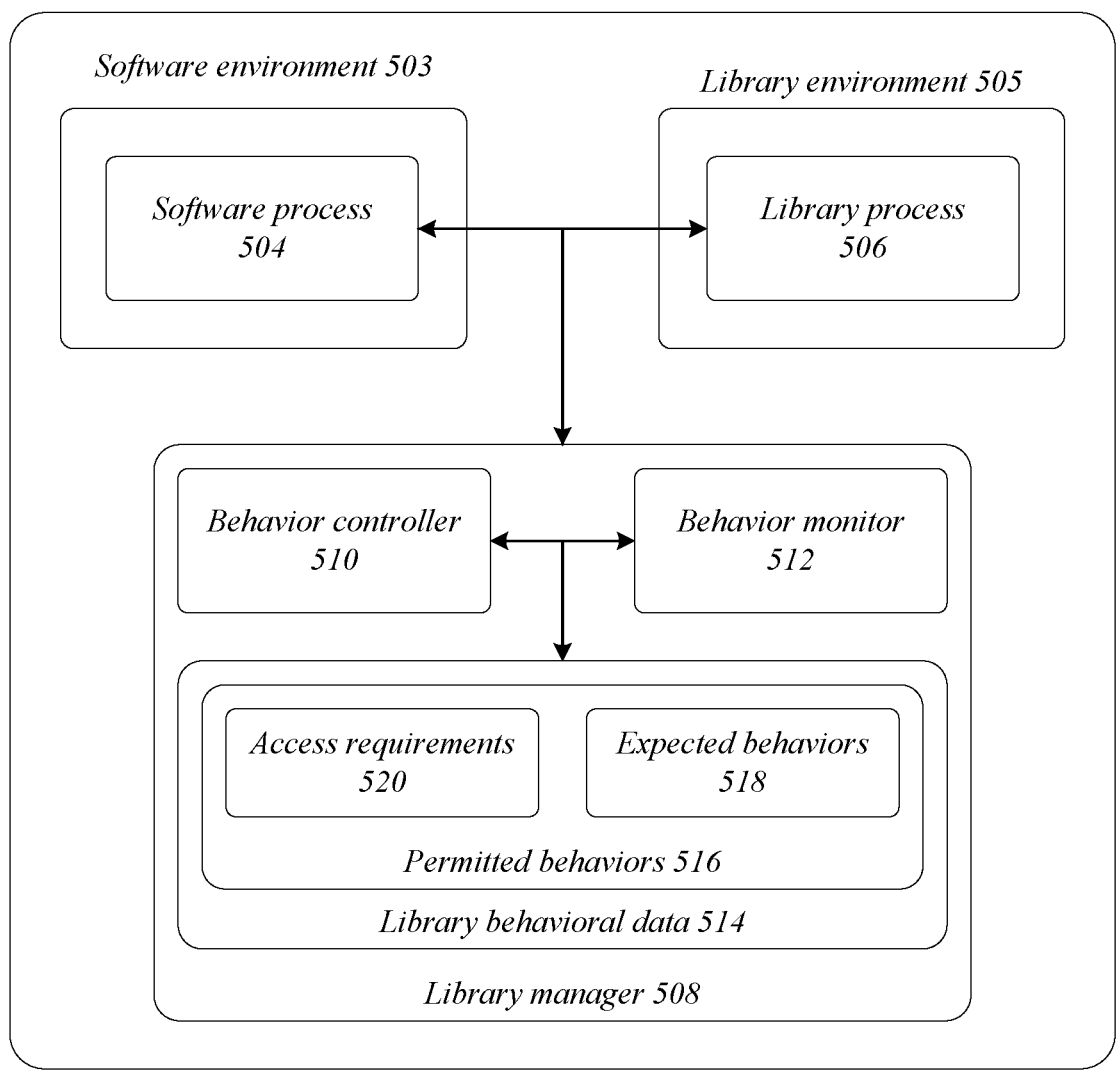
FIG. 5 illustrates exemplary aspects of runtime components according to one or more embodiments described here.

FIG. 5 illustrates exemplary aspects of a runtime environment 502 in operating environment 500 according to one or more embodiments described herein. Runtime environment 500 may include software runtime environment 503 with software process 504, library runtime environment 505 with library process 506, and library manager 508. In some embodiments, library manager 508 may be implemented in software runtime environment 503. In other embodiments, library manager 508 may be implemented in a different runtime environment, such as a system runtime environment. In one or more embodiments described herein, the behavior of library process 506 may be monitored by behavior monitor 512 of library manager 508 to identify abnormal behavior based on library behavioral data 514. In one or more such embodiments, behavior controller 510 may implement one or more protective actions in response to the identification of abnormal behavior by library process 506. Embodiments are not limited in this context.

In several embodiments, one or more executables, such as those generated in compiler environment 260, may be executed/implemented in runtime environment 502. In the illustrated embodiment, the executables may cause software runtime environment 503 and/or software process 504 to be created to implement a software (e.g., software 104), library runtime environment 505 and/or library process 506 to be created to implement a library (e.g., library 106), and library manager 508 to be implemented with behavior controller 510, behavior monitor 512, and library behavioral data 514 with permitted behaviors 516 including access requirement 520 of the library and expected behaviors 518 of the library.

In various embodiments, one or more of a software, a library, and library manager 508 may be implemented in one or more runtime environments 502, or partitions thereof. In many embodiments, a permission subsystem, such as behavior monitor 512 may validate library code is executing within permitted behaviors 516, such as by comparing behavior of a library access with one or more access requirements 520 and expected behaviors 518. In some embodiments, one or more components of runtime environment 502 may be the same or similar to runtime environment 102.

In some embodiments, behavior monitor 512 may use profiler technologies to track which library is calling which function tree until the disk/network/registry access so that execution of the code can be blocked by behavior controller 510 if there is an unpermitted behavior. In some embodiments, one or more components of library manager 508, such as behavior monitor 512, may be an external reference monitor that tracks information from a profiler such that in case of unpermitted behavior, a main process can be interrupted/rolled back. In one or more embodiments, one or more components of library manager 508, such as behavior controller 510 and behavior monitor 512, may be comprised in an operating system (OS). In one or more such embodiments, this may enable the OS to protect its own sensitive disk, network, and registry access application program interface (API) (or others as necessary).

Figure 6A:
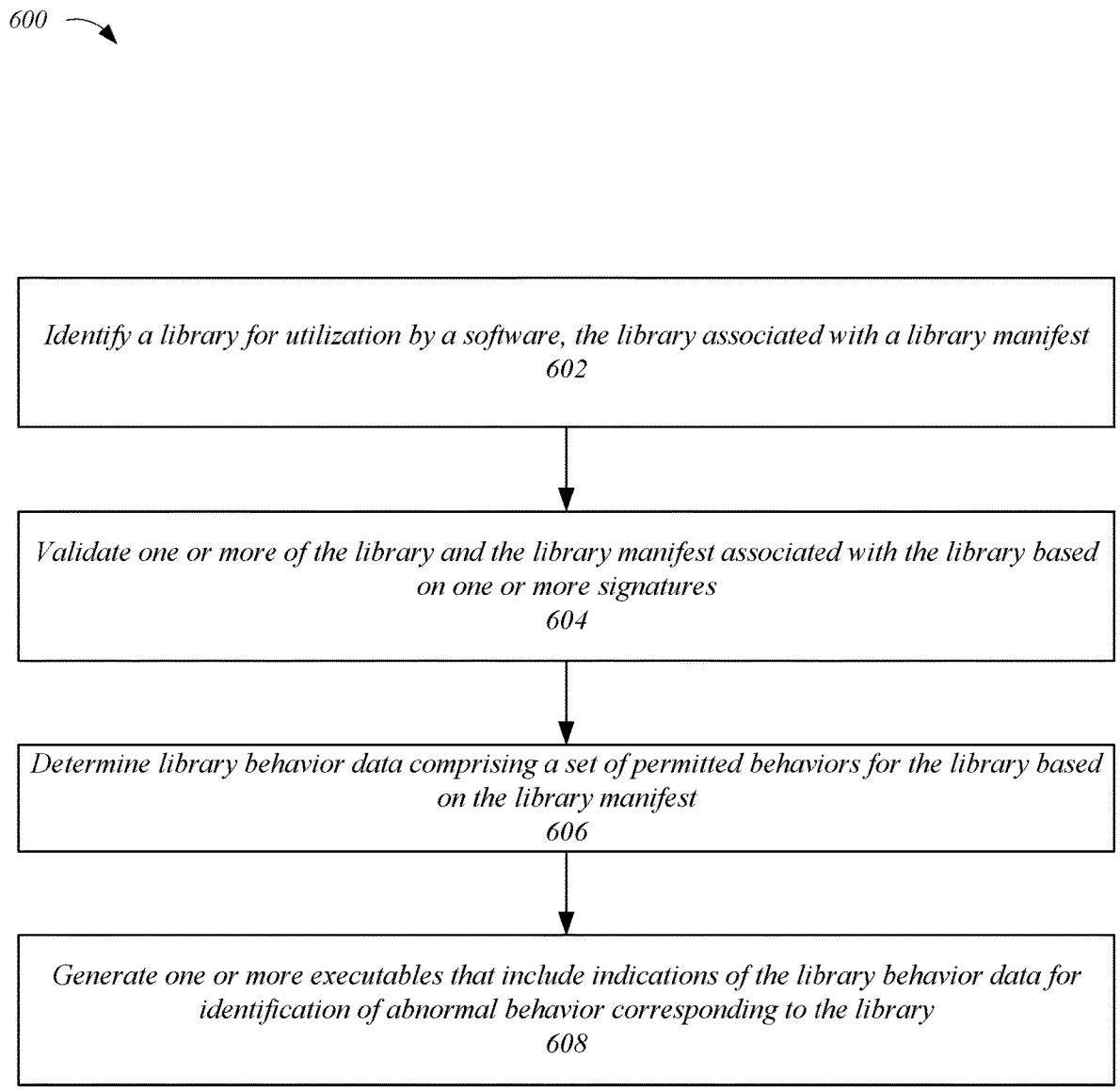
FIG. 6A illustrates an embodiment of a first logic flow according to one or more embodiments described herein.

FIG. 6A illustrates one embodiment of a logic flow 600, which may be representative of operations that may be executed in various embodiments in conjunction with techniques for library behavior verification. The logic flow 600 may be representative of some or all of the operations that may be executed by one or more components/devices/environments described herein, such as compiler environment 260. The embodiments are not limited in this context.

In the illustrated embodiments, logic flow 600 may begin at block 602. At block 602 "identify a library for utilization by a software, the library associated with a library manifest" a library associated with a library manifest may be identified for utilization by software. For example, library 106 associated with library manifest 332 may be identified for utilization by software 104. Continuing to block 604 "validate one or more of the library and the library manifest associated with the library based on one or more signatures" one or more of the library and the library manifest associated with the library may be validated based on one or more signatures. In some embodiments, validator 462 may utilize signatures 338 to validate library manifest 332 and/or library 106. In some such embodiments, validator 462 may utilize one or more public keys to validate the one or more signatures 338.

At block 606 "determine library behavior data comprising a set of permitted behaviors for the library based on the library manifest" library behavior data including a set of permitted behaviors may be determined based on the library manifest. For example, behavior data manager 464 and/or access manager 466 may determine a set of permitted behaviors for library 106 based on library manifest 332. Proceeding to block 608 "generate one or more executables that include indications of the library behavior data for identification of abnormal behavior corresponding to the library" one or more executables with indications of library behavior data for identifying abnormal library behavior may be generated. For instance, compiler 472 may generated one or more executables 474 that include indications of library behavior data generated by behavioral data manager 464.

Figure 6B:
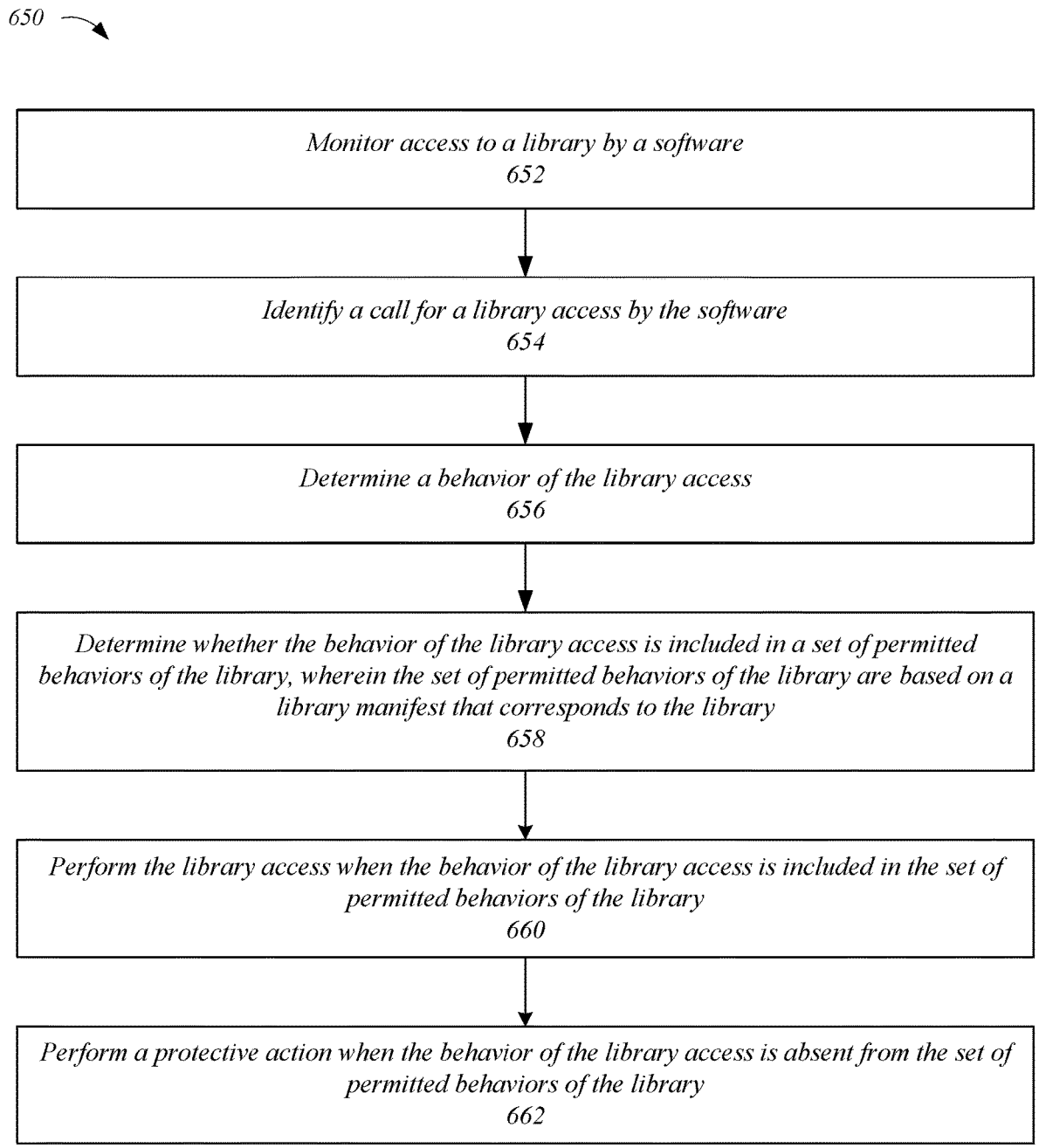
FIG. 6B illustrates an embodiment of a second logic flow according to one or more embodiments described herein.

FIG. 6B illustrates one embodiment of a logic flow 650, which may be representative of operations that may be executed in various embodiments in conjunction with techniques for library behavior verification. The logic flow 650 may be representative of some or all of the operations that may be executed by one or more components/devices/environments described herein, such as runtime environment 102 or runtime environment 502. The embodiments are not limited in this context.

In the illustrated embodiments, logic flow 650 may begin at block 652. At block 652 "monitor access to a library by a software" access to a library by software may be monitored. For example, behavior monitor 512 may monitor access to library process 506 by software process 504. Proceeding to block 654 "identify a call for a library access by the software" a library call by the software may be identified. For instance, behavior monitor 512 may identify a call to library process 506 by software process 504.

At block 656 "determine a behavior of the library access" a behavior of the library access may be determined. In some embodiments, one or more components of library manager 508, such as behavior monitor 512, may determine the behavior of the library access. Continuing to block 658 "determine whether the behavior of the library access is included in a set of permitted behaviors of the library, wherein the set of permitted behaviors of the library are based on a library manifest that corresponds to the library" it may be determined whether the behavior of the library access in included in a set of permitted behaviors of the library. For example, behavior monitor 512 may determine whether the behavior of the library access from software process 504 is included in a set of permitted behaviors 516 of the library 106.

Proceeding to block 660 "perform the library access when the behavior of the library access is included in the set of permitted behaviors of the library" the library access may be performed when the behavior of the library access is included in the set of permitted behaviors of the library. For instance, the library access from software process 504 to library process 506 may proceed uninterrupted based, at least in part, on a determination by library manager 508 that the behavior of the library access is included in permitted behavior 516. At block 662 "perform a protective action when the behavior of the library access is absent from the set of permitted behaviors of the library" a protective action may be performed when the behavior of the library is absent from the set of permitted behaviors of the library. In some embodiments, library manager 5008 may determine the behavior of the library access called by software process 504 would violate permitted behaviors, and cause behavior controller 510 to block, or otherwise prevent, the library access. For example, behavior controller 510 may generate an interrupt.

FIG. 7 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may store computer-executable instructions, such as computer-executable instructions to implement one or more of logic flows or operations described herein, such as with respect to logic flow 600 of FIG. 6A and logic flow 650 of FIG. 6B. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
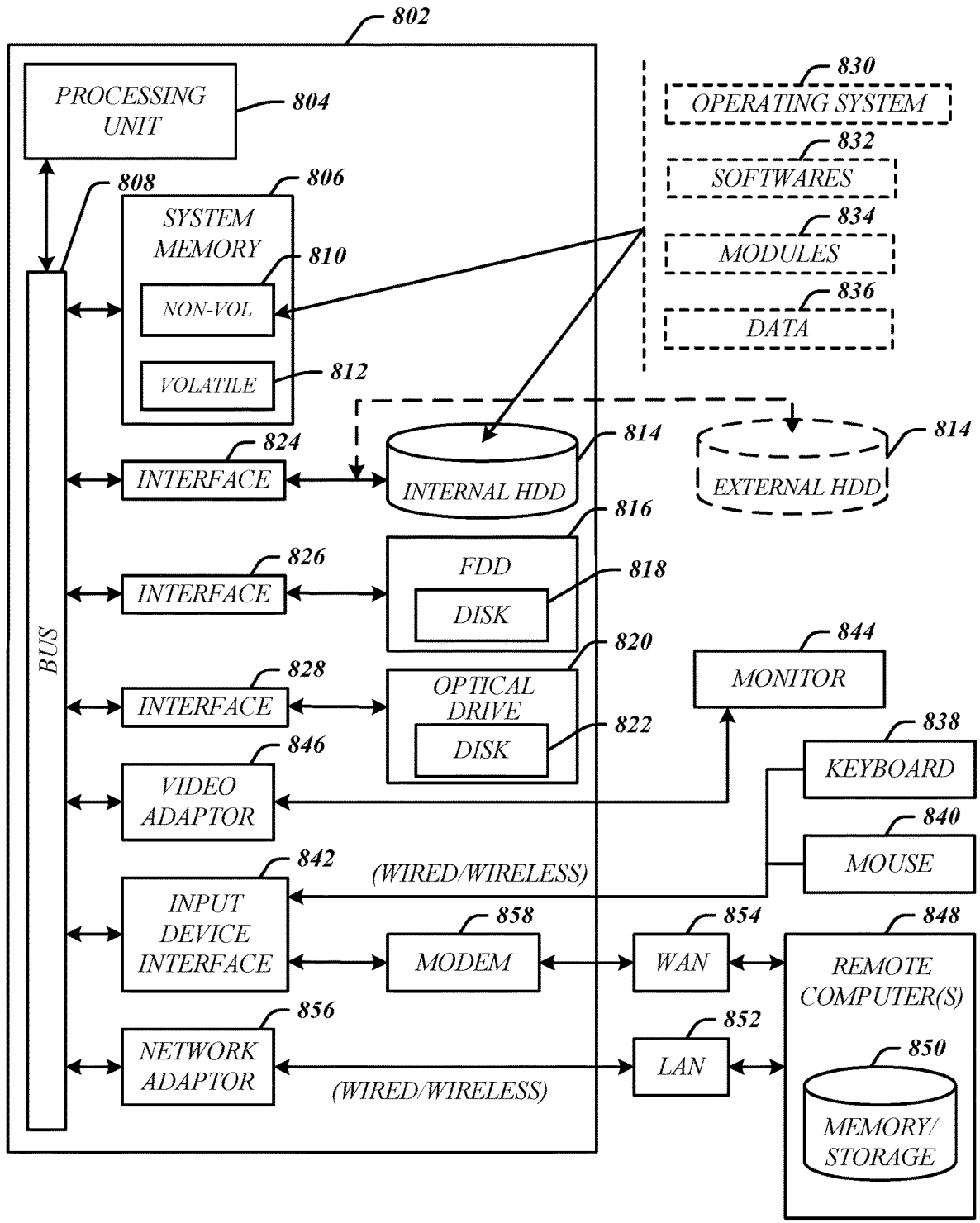
FIG. 8 illustrates an embodiment of a computing architecture according to one or more embodiments described herein.

FIG. 8 illustrates an embodiment of an exemplary computing architecture 800 that may be suitable for implementing various embodiments as previously described. In various embodiments, the computing architecture 800 may comprise or be implemented as part of an electronic device. In some embodiments, the computing architecture 800 may be representative, for example, of one or more component described herein. In some embodiments, computing architecture 800 may be representative, for example, of a computing device that implements or utilizes one or more of developer environment 230, versioning system 250, compiler environment 260, runtime environment 102, and/or one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. In some embodiments, system memory 806 may include main memory. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and Institute of Electrical and Electronics Engineers (IEEE) 994 interface technologies. In various embodiments, these types of memory may not be included in main memory or system memory.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include or implement, for example, the various techniques, applications, and/or components described herein.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 994 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. In various embodiments, one or more migrations may occur via the networked environment. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
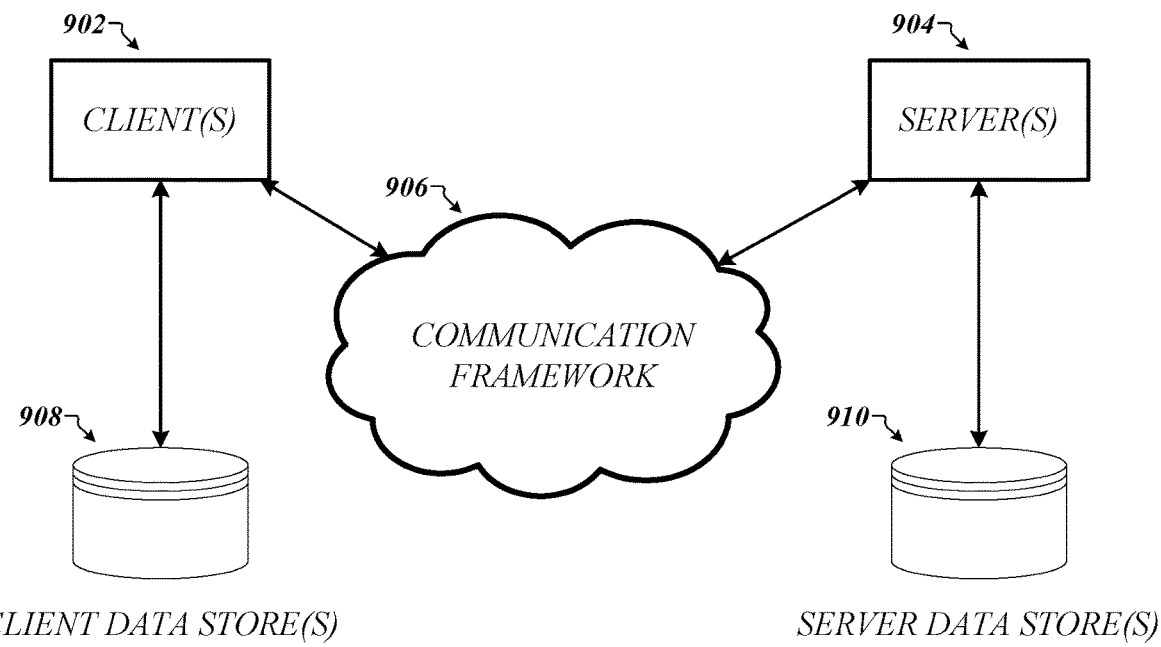
FIG. 9 illustrates an embodiment of a communications architecture according to one or more embodiments described herein.

FIG. 9 illustrates a block diagram of an exemplary communications architecture 900 suitable for implementing various embodiments as previously described, such as virtual machine migration. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. In some embodiments communications architecture may include or implement one or more portions of components, applications, and/or techniques described herein. The clients 902 and the servers 904 are operatively connected to one or more respective client data stores 908 and server data stores 910 that can be employed to store information local to the respective clients 902 and servers 904, such as cookies and/or associated contextual information. In various embodiments, any one of servers 904 may implement one or more of logic flows or operations described herein, and storage medium 700 of FIG. 7 in conjunction with storage of data received from any one of clients 902 on any of server data stores 910. In one or more embodiments, one or more of client data store(s) 908 or server data store(s) 910 may include memory accessible to one or more portions of components, applications, and/or techniques described herein.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments, from which numerous permutations and configurations will be apparent.

Example 1 is an apparatus, the apparatus comprising: a processor; and a memory comprising instructions that when executed by the processor cause the processor to: identify a library for utilization by software, the library associated with a library manifest; validate one or more of the library and the library manifest associated with the library based on one or more signatures; determine library behavior data comprising a set of permitted behaviors for the library based on the library manifest; and generate one or more executables that include indications of the library behavior data for identification of abnormal behavior corresponding to the library.

Example 2 includes the subject matter of Example 1, the memory comprising instructions that when executed by the processor cause the processor to utilize a public key associated with the library to validate a signature for the library.

Example 3 includes the subject matter of Example 1, the memory comprising instructions that when executed by the processor cause the processor to utilize a public key associated with the library manifest to validate a signature for the library manifest.

Example 4 includes the subject matter of Example 1, the memory comprising instructions that when executed by the processor cause the processor to compile code to generate the one or more executables.

Example 5 includes the subject matter of Example 1, the set of permitted behaviors of the library comprising one or more access requirements and one or more expected behaviors.

Example 6 includes the subject matter of Example 5, the one or more expected behaviors including one or more of a stack operation, a control flow transfer, a read operation, a write operation, registry modifications of specific registry hives, access to specific directories, network access to specific sites, ports, and protocols.

Example 7 includes the subject matter of Example 5, the one or more access requirements including one or more of driver access, directory access, registry access, network access, kernel access, memory access, ring-level access, process access, system management mode (SMM) access, and trusted execution environment (TEE) access.

Example 8 includes the subject matter of Example 1, the one or more executables to implement the library in a runtime environment separate from the software.

Example 9 includes the subject matter of Example 8, the runtime environment separate from the software comprising a separate process or a sandbox.

Example 10 includes the subject matter of Example 1, the memory comprising instructions that when executed by the processor cause the processor to validate the library manifest associated with the library based on one or more signatures and one or more public keys.

Example 11 includes the subject matter of Example 10, the one or more signatures comprising a digital signature of the library generated with a private key.

Example 12 includes the subject matter of Example 1, the memory comprising instructions that when executed by the processor cause the processor to receive the library and the library manifest, and the one or more signatures from a versioning system.

Example 13 includes the subject matter of Example 12, the one or more signatures comprising a digital signature of the library and a digital signature of the library manifest.

Example 14 includes the subject matter of Example 1, the software comprising an application.

Example 15 is an apparatus, the apparatus comprising: a processor; and a memory comprising instructions that when executed by the processor cause the processor to: monitor access to a library by software; identify a call for a library access by the software; determine a behavior of the library access; determine whether the behavior of the library access is included in a set of permitted behaviors of the library, wherein the set of permitted behaviors of the library are based on a library manifest that corresponds to the library; perform the library access when the behavior of the library access is included in the set of permitted behaviors of the library; and perform a protective action when the behavior of the library access is absent from the set of permitted behaviors of the library.

Example 16 includes the subject matter of Example 15, the memory comprising instructions that when executed by the processor cause the processor to implement the software in a first runtime environment and the library in a second runtime environment.

Example 17 includes the subject matter of Example 16, the first runtime environment comprising a first process and the second runtime environment comprising a second process.

Example 18 includes the subject matter of Example 16, the second runtime environment comprising a sandbox.

Example 19 includes the subject matter of Example 15, the protective actions comprising one or more of preventing the library access, generating an alert, and creating a log entry.

Example 20 includes the subject matter of Example 15, the set of permitted behaviors of the library comprising one or more access requirements and one or more expected behaviors.

Example 21 includes the subject matter of Example 20, the one or more expected behaviors including one or more of a stack operation, a control flow transfer, a read operation, a write operation, registry modifications of specific registry hives, access to specific directories, network access to specific sites, ports, and protocols.

Example 22 includes the subject matter of Example 20, the one or more access requirements including one or more of driver access, directory access, registry access, network access, kernel access, memory access, ring-level access, process access, system management mode (SMM) access, and trusted execution environment (TEE) access.

Example 23 includes the subject matter of Example 15, wherein the library manifest is validated to correspond with the library based on one or more signatures.

Example 24 includes the subject matter of Example 23, the one or more signatures comprising a digital signature of the library and a digital signature of the library manifest.

Example 25 includes the subject matter of Example 23, the library, the library manifest, and the one or more signatures received from a versioning system.

Example 26 includes the subject matter of Example 15, the software comprising an application or enterprise software.

Example 27 is at least one non-transitory computer-readable medium comprising a set of instructions that, in response to being executed by a processor circuit, cause the processor circuit to: identify a library for utilization by software, the library associated with a library manifest; validate one or more of the library and the library manifest associated with the library based on one or more signatures; determine library behavior data comprising a set of permitted behaviors for the library based on the library manifest; and generate one or more executables that include indications of the library behavior data for identification of abnormal behavior corresponding to the library.

Example 28 includes the subject matter of Example 27, comprising instructions that, in response to being executed by the processor circuit cause the processor circuit to utilize a public key associated with the library to validate a signature for the library.

Example 29 includes the subject matter of Example 27, comprising instructions that, in response to being executed by the processor circuit cause the processor circuit to utilize a public key associated with the library manifest to validate a signature for the library manifest.

Example 30 includes the subject matter of Example 27, comprising instructions that, in response to being executed by the processor circuit cause the processor circuit to compile code to generate the one or more executables.

Example 31 includes the subject matter of Example 27, the set of permitted behaviors of the library comprising one or more access requirements and one or more expected behaviors.

Example 32 includes the subject matter of Example 31, the one or more expected behaviors including one or more of a stack operation, a control flow transfer, a read operation, a write operation, registry modifications of specific registry hives, access to specific directories, network access to specific sites, ports, and protocols.

Example 33 includes the subject matter of Example 31, the one or more access requirements including one or more of driver access, directory access, registry access, network access, kernel access, memory access, ring-level access, process access, system management mode (SMM) access, and trusted execution environment (TEE) access.

Example 34 includes the subject matter of Example 27, the one or more executables to implement the library in a runtime environment separate from the software.

Example 35 includes the subject matter of Example 34, the runtime environment separate from the software comprising a separate process or a sandbox.

Example 36 includes the subject matter of Example 27, comprising instructions that, in response to being executed by the processor circuit cause the processor circuit to validate the library manifest associated with the library based on one or more signatures and one or more public keys.

Example 37 includes the subject matter of Example 36, the one or more signatures comprising a digital signature of the library generated with a private key.

Example 38 includes the subject matter of Example 27, comprising instructions that, in response to being executed by the processor circuit cause the processor circuit to receive the library and the library manifest, and the one or more signatures from a versioning system.

Example 39 includes the subject matter of Example 38, the one or more signatures comprising a digital signature of the library and a digital signature of the library manifest.

Example 40 includes the subject matter of Example 27, the software comprising an application.

Example 41 is at least one non-transitory computer-readable medium comprising a set of instructions that, in response to being executed by a processor circuit, cause the processor circuit to: monitor access to a library by software; identify a call for a library access by the software; determine a behavior of the library access; determine whether the behavior of the library access is included in a set of permitted behaviors of the library, wherein the set of permitted behaviors of the library are based on a library manifest that corresponds to the library; perform the library access when the behavior of the library access is included in the set of permitted behaviors of the library; and perform a protective action when the behavior of the library access is absent from the set of permitted behaviors of the library.

Example 42 includes the subject matter of Example 41, comprising instructions that, in response to being executed by the processor circuit cause the processor circuit to implement the software in a first runtime environment and the library in a second runtime environment.

Example 43 includes the subject matter of Example 42, the first runtime environment comprising a first process and the second runtime environment comprising a second process.

Example 44 includes the subject matter of Example 42, the second runtime environment comprising a sandbox.

Example 45 includes the subject matter of Example 41, the protective actions comprising one or more of preventing the library access, generating an alert, and creating a log entry.

Example 46 includes the subject matter of Example 41, the set of permitted behaviors of the library comprising one or more access requirements and one or more expected behaviors.

Example 47 includes the subject matter of Example 46, the one or more expected behaviors including one or more of a stack operation, a control flow transfer, a read operation, a write operation, registry modifications of specific registry hives, access to specific directories, network access to specific sites, ports, and protocols.

Example 48 includes the subject matter of Example 46, the one or more access requirements including one or more of driver access, directory access, registry access, network access, kernel access, memory access, ring-level access, process access, system management mode (SMM) access, and trusted execution environment (TEE) access.

Example 49 includes the subject matter of Example 41, wherein the library manifest is validated to correspond with the library based on one or more signatures.

Example 50 includes the subject matter of Example 49, the one or more signatures comprising a digital signature of the library and a digital signature of the library manifest.

Example 51 includes the subject matter of Example 49, the library, the library manifest, and the one or more signatures received from a versioning system.

Example 52 includes the subject matter of Example 41, the software comprising an application or enterprise software.

Example 53 is a computer-implemented method comprising: identifying a library for utilization by software, the library associated with a library manifest; validating one or more of the library and the library manifest associated with the library based on one or more signatures; determining library behavior data comprising a set of permitted behaviors for the library based on the library manifest; and generating one or more executables that include indications of the library behavior data for identification of abnormal behavior corresponding to the library.

Example 54 includes the subject matter of Example 53, comprising utilizing a public key associated with the library to validate a signature for the library.

Example 55 includes the subject matter of Example 53, comprising utilizing a public key associated with the library manifest to validate a signature for the library manifest.

Example 56 includes the subject matter of Example 53, comprising compiling code to generate the one or more executables.

Example 57 includes the subject matter of Example 53, the set of permitted behaviors of the library comprising one or more access requirements and one or more expected behaviors.

Example 60 includes the subject matter of Example 57, the one or more expected behaviors including one or more of a stack operation, a control flow transfer, a read operation, a write operation, registry modifications of specific registry hives, access to specific directories, network access to specific sites, ports, and protocols.

Example 59 includes the subject matter of Example 57, the one or more access requirements including one or more of driver access, directory access, registry access, network access, kernel access, memory access, ring-level access, process access, system management mode (SMM) access, and trusted execution environment (TEE) access.

Example 60 includes the subject matter of Example 53, the one or more executables to implement the library in a runtime environment separate from the software.

Example 61 includes the subject matter of Example 60, the runtime environment separate from the software comprising a separate process or a sandbox.

Example 62 includes the subject matter of Example 53, comprising validating the library manifest associated with the library based on one or more signatures and one or more public keys.

Example 63 includes the subject matter of Example 62, the one or more signatures comprising a digital signature of the library generated with a private key.

Example 64 includes the subject matter of Example 53, comprising receiving the library and the library manifest, and the one or more signatures from a versioning system.

Example 65 includes the subject matter of Example 64, the one or more signatures comprising a digital signature of the library and a digital signature of the library manifest.

Example 66 includes the subject matter of Example 53, the software comprising an application.

Example 67 is a computer-implemented method comprising: monitoring access to a library by software; identifying a call for a library access by the software; determining a behavior of the library access; determining whether the behavior of the library access is included in a set of permitted behaviors of the library, wherein the set of permitted behaviors of the library are based on a library manifest that corresponds to the library; performing the library access when the behavior of the library access is included in the set of permitted behaviors of the library; and performing a protective action when the behavior of the library access is absent from the set of permitted behaviors of the library.

Example 68 includes the subject matter of Example 67, comprising implementing the software in a first runtime environment and the library in a second runtime environment.

Example 69 includes the subject matter of Example 68, the first runtime environment comprising a first process and the second runtime environment comprising a second process.

Example 70 includes the subject matter of Example 68, the second runtime environment comprising a sandbox.

Example 71 includes the subject matter of Example 67, the protective actions comprising one or more of preventing the library access, generating an alert, and creating a log entry.

Example 72 includes the subject matter of Example 67, the set of permitted behaviors of the library comprising one or more access requirements and one or more expected behaviors.

Example 73 includes the subject matter of Example 72, the one or more expected behaviors including one or more of a stack operation, a control flow transfer, a read operation, a write operation, registry modifications of specific registry hives, access to specific directories, network access to specific sites, ports, and protocols.

Example 74 includes the subject matter of Example 72, the one or more access requirements including one or more of driver access, directory access, registry access, network access, kernel access, memory access, ring-level access, process access, system management mode (SMM) access, and trusted execution environment (TEE) access.

Example 75 includes the subject matter of Example 67, wherein the library manifest is validated to correspond with the library based on one or more signatures.

Example 76 includes the subject matter of Example 75, the one or more signatures comprising a digital signature of the library and a digital signature of the library manifest.

Example 77 includes the subject matter of Example 75, the library, the library manifest, and the one or more signatures received from a versioning system.

Example 78 includes the subject matter of Example 67, the software comprising an application or enterprise software.

Example 79 is an apparatus comprising: means for identifying a library for utilization by software, the library associated with a library manifest; means for validating one or more of the library and the library manifest associated with the library based on one or more signatures; means for determining library behavior data comprising a set of permitted behaviors for the library based on the library manifest; and means for generating one or more executables that include indications of the library behavior data for identification of abnormal behavior corresponding to the library.

Example 80 includes the subject matter of Example 79, comprising means for utilizing a public key associated with the library to validate a signature for the library.

Example 81 includes the subject matter of Example 79, comprising means for utilizing a public key associated with the library manifest to validate a signature for the library manifest.

Example 82 includes the subject matter of Example 79, comprising means for compiling code to generate the one or more executables.

Example 83 includes the subject matter of Example 79, the set of permitted behaviors of the library comprising one or more access requirements and one or more expected behaviors.

Example 84 includes the subject matter of Example 83, the one or more expected behaviors including one or more of a stack operation, a control flow transfer, a read operation, a write operation, registry modifications of specific registry hives, access to specific directories, network access to specific sites, ports, and protocols.

Example 85 includes the subject matter of Example 83, the one or more access requirements including one or more of driver access, directory access, registry access, network access, kernel access, memory access, ring-level access, process access, system management mode (SMM) access, and trusted execution environment (TEE) access.

Example 86 includes the subject matter of Example 79, the one or more executables to implement the library in a runtime environment separate from the software.

Example 87 includes the subject matter of Example 86, the runtime environment separate from the software comprising a separate process or a sandbox.

Example 88 includes the subject matter of Example 79, comprising means for validating the library manifest associated with the library based on one or more signatures and one or more public keys.

apparatus of claim 88, the one or more signatures comprising a digital signature of the library generated with a private key.

Example 90 includes the subject matter of Example 79, comprising means for receiving the library and the library manifest, and the one or more signatures from a versioning system.

Example 91 includes the subject matter of Example 90, the one or more signatures comprising a digital signature of the library and a digital signature of the library manifest.

Example 92 includes the subject matter of Example 79, the software comprising an application.

Example 93 is an apparatus comprising: means for monitoring access to a library by software; means for identifying a call for a library access by the software; means for determining a behavior of the library access; means for determining whether the behavior of the library access is included in a set of permitted behaviors of the library, wherein the set of permitted behaviors of the library are based on a library manifest that corresponds to the library; means for performing the library access when the behavior of the library access is included in the set of permitted behaviors of the library; and means for performing a protective action when the behavior of the library access is absent from the set of permitted behaviors of the library.

Example 94 includes the subject matter of Example 93, comprising means for implementing the software in a first runtime environment and the library in a second runtime environment.

Example 95 includes the subject matter of Example 94, the first runtime environment comprising a first process and the second runtime environment comprising a second process.

Example 96 includes the subject matter of Example 94, the second runtime environment comprising a sandbox.

Example 97 includes the subject matter of Example 93, the protective actions comprising one or more of preventing the library access, generating an alert, and creating a log entry.

Example 98 includes the subject matter of Example 93, the set of permitted behaviors of the library comprising one or more access requirements and one or more expected behaviors.

Example 99 includes the subject matter of Example 98, the one or more expected behaviors including one or more of a stack operation, a control flow transfer, a read operation, a write operation, registry modifications of specific registry hives, access to specific directories, network access to specific sites, ports, and protocols.

Example 100 includes the subject matter of Example 98, the one or more access requirements including one or more of driver access, directory access, registry access, network access, kernel access, memory access, ring-level access, process access, system management mode (SMM) access, and trusted execution environment (TEE) access.

Example 101 includes the subject matter of Example 93, wherein the library manifest is validated to correspond with the library based on one or more signatures.

Example 102 includes the subject matter of Example 101, the one or more signatures comprising a digital signature of the library and a digital signature of the library manifest.

Example 103 includes the subject matter of Example 101, the library, the library manifest, and the one or more signatures received from a versioning system.

Example 104 includes the subject matter of Example 93, the software comprising an application or enterprise software.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. An apparatus, the apparatus comprising:
a processor; and
a memory comprising instructions that when executed by the processor cause the processor to:
identify a library for utilization by software, the library associated with a library manifest;
validate one or more of the library and the library manifest associated with the library based on one or more signatures;
determine library behavior data comprising a set of permitted behaviors for the library based on the library manifest; and
compile code to generate one or more executables that include indications of the library behavior data for identification of abnormal behavior corresponding to the library.

2. The apparatus of claim 1, the memory comprising instructions that when executed by the processor cause the processor to utilize a public key associated with the library to validate a signature for the library.

3. The apparatus of claim 1, the memory comprising instructions that when executed by the processor cause the processor to utilize a public key associated with the library manifest to validate a signature for the library manifest.

4. The apparatus of claim 1, the set of permitted behaviors of the library comprising one or more access requirements and one or more expected behaviors.

5. The apparatus of claim 4, the one or more expected behaviors including one or more of a stack operation, a control flow transfer, a read operation, a write operation, registry modifications of specific registry hives, access to specific directories, network access to specific sites, ports, and protocols.

6. The apparatus of claim 4, the one or more access requirements including one or more of driver access, directory access, registry access, network access, kernel access, memory access, ring-level access, process access, system management mode (SMM) access, and trusted execution environment (TEE) access.

7. The apparatus of claim 1, the one or more executables to implement the library in a runtime environment separate from the software.

8. The apparatus of claim 7, the runtime environment separate from the software comprising a separate process or a sandbox.

9. The apparatus of claim 1, the memory comprising instructions that when executed by the processor cause the processor to validate the library manifest associated with the library based on one or more signatures and one or more public keys.

10. The apparatus of claim 9, the one or more signatures comprising a digital signature of the library generated with a private key.

11. The apparatus of claim 1, the memory comprising instructions that when executed by the processor cause the processor to receive the library and the library manifest, and the one or more signatures from a versioning system.

12. The apparatus of claim 11, the one or more signatures comprising a digital signature of the library and a digital signature of the library manifest.

13. The apparatus of claim 1, the software comprising an application.

14. At least one non-transitory computer-readable medium comprising a set of instructions that, in response to being executed by a processor circuit, cause the processor circuit to:
monitor access to a library by software;
identify a call for a library access by the software, wherein the software executed in a first runtime environment and the library in a second runtime environment;
determine a behavior of the library access;
determine whether the behavior of the library access is included in a set of permitted behaviors of the library, wherein the set of permitted behaviors of the library are based on a library manifest that corresponds to the library;
perform the library access when the behavior of the library access is included in the set of permitted behaviors of the library; and
perform a protective action when the behavior of the library access is absent from the set of permitted behaviors of the library.

15. The at least one non-transitory computer-readable medium of claim 14, the first runtime environment comprising a first process and the second runtime environment comprising a second process.

16. The at least one non-transitory computer-readable medium of claim 14, the second runtime environment comprising a sandbox.

17. The at least one non-transitory computer-readable medium of claim 14, the protective action comprising one or more of preventing the library access, generating an alert, and creating a log entry.

18. The at least one non-transitory computer-readable medium of claim 14, the set of permitted behaviors of the library comprising one or more access requirements and one or more expected behaviors.

19. The at least one non-transitory computer-readable medium of claim 18, the one or more expected behaviors including one or more of a stack operation, a control flow transfer, a read operation, a write operation, registry modifications of specific registry hives, access to specific directories, network access to specific sites, ports, and protocols.

20. The at least one non-transitory computer-readable medium of claim 18, the one or more access requirements including one or more of driver access, directory access, registry access, network access, kernel access, memory access, ring-level access, process access, system management mode (SMM) access, and trusted execution environment (TEE) access.

21. A computer-implemented method comprising:
identifying a library for utilization by software, the library associated with a library manifest;
validating one or more of the library and the library manifest associated with the library based on one or more signatures;
determining library behavior data comprising a set of permitted behaviors for the library based on the library manifest; and compiling code to generate one or more executables that include indications of the library behavior data for identification of abnormal behavior corresponding to the library.

22. The computer-implemented method of claim 21, comprising utilizing a public key associated with the library to validate a signature for the library.

23. The computer-implemented method of claim 21, comprising utilizing a public key associated with the library manifest to validate a signature for the library manifest.

* * * * *